US008672192B2

(12) United States Patent
Wang

(10) Patent No.: US 8,672,192 B2
(45) Date of Patent: Mar. 18, 2014

(54) PUSH-TYPE NOZZLE ASSEMBLY

(76) Inventor: Ya-Tsan Wang, HsinChu (TW)

( * ) Notice: Subject to any disclaimer, the term of this patent is extended or adjusted under 35 U.S.C. 154(b) by 163 days.

(21) Appl. No.: 13/067,257

(22) Filed: May 19, 2011

(65) Prior Publication Data

US 2012/0292347 A1 Nov. 22, 2012

(51) Int. Cl.
*G01F 11/00* (2006.01)

(52) U.S. Cl.
USPC ...................... 222/321.9; 222/385; 222/321.2

(58) Field of Classification Search
USPC ............. 222/321.7–321.9, 321.2, 385, 383.1, 222/321.1, 321.6, 372, 382, 340
See application file for complete search history.

(56) References Cited

U.S. PATENT DOCUMENTS 3,187,960 A * 6/1965 Gorman ..................... 222/321.9
4,512,501 A * 4/1985 Foster ...................... 222/153.13
5,271,530 A * 12/1993 Uehira et al. ................. 222/190
5,720,419 A * 2/1998 Li ............................. 222/321.2
6,045,008 A * 4/2000 Gonzalez Fernandez et al. ........................ 222/153.13
6,196,424 B1 * 3/2001 Bougamont et al. ....... 222/321.9
6,415,959 B1 * 7/2002 Bougamont et al. .......... 222/159
6,422,425 B1 * 7/2002 Tada ........................ 222/153.07
7,059,499 B2 * 6/2006 Masuda ..................... 222/321.9
7,281,644 B2 * 10/2007 Cater ......................... 222/321.7
8,056,770 B2 * 11/2011 Lompech et al. .......... 222/321.2
2008/0118368 A1 * 5/2008 Roy et al. ......................... 417/36
2008/0210713 A1 * 9/2008 Langlois et al. ........... 222/321.9
2011/0278328 A1 * 11/2011 Kang ............................ 222/340
2012/0267399 A1 * 10/2012 Moretti ...................... 222/321.2
2012/0325862 A1 * 12/2012 Kuwahara et al. ......... 222/321.9

* cited by examiner

*Primary Examiner* — Kevin P Shaver
*Assistant Examiner* — Robert Nichols, II

(57) ABSTRACT

A push-type nozzle assembly includes a main tube, a valve, a suction unit and a push unit. The suction unit includes a push rod, a connection rod, a block and a seal sleeve. A spring is mounted between the seal sleeve and the push rod. The spring provides a force to move the block and the connection rod back and forth between the closed position and an open position. Because the spring is located outside of the push rod, the spring does directly contact the liquid which is avoided from being chemically changed.

6 Claims, 7 Drawing Sheets

PUSH-TYPE NOZZLE ASSEMBLY

BACKGROUND OF THE INVENTION

1. Field of the Invention

The present invention relates to a nozzle assembly, and more particularly, to a push-type nozzle assembly for liquid.

2. Description of Prior Art

A conventional nozzle assembly 100 is shown in FIG. 6 and generally includes a push mount 101 with an outlet 101*a* and a cover 102 is connected to the push mount 101. The cover 102 has a suction tube 103 connected thereto and a cone-shaped cap 104 is connected to the suction tube 103. A tube 105 extends through the cone-shaped cap 104 which seals the holes 105*a* of the tube 105. A spring 106 is connected to the tube 105 and a bead 107 is engaged with the spring 106. A reception tube 108 accommodates the suction tube 103, the cone-shaped cap 104, the tube 105, the spring 106 and the bead 107 therein. A hose 109 is connected to the reception tube 108.

By pushing the push mount 101 to le the air in the container escape from the outlet 101*a* and the lower pressure sucks the liquid in the container into the reception tube 108 via the hose 109. The spring 106 is compressed and the bottom of the tube 105 contacts the bead 107 which seals the hole 108*a* of the reception tube 108 such that a gap is defined between the tube 105 and the cone-shaped cap 104. The liquid in the reception tube 108 enters into the tube 105 via the hole 105*a* and the gap. The liquid is then sucked and escapes from the outlet 101*a* via the suction tube 103. When releasing the push mount 101, the liquid in the reception tube 108 flows back to the container.

Although the conventional push-type nozzle assembly 100 can suck the liquid and spray the liquid from the nozzle, the spring 106 and the bead 107 made by metal and are in contact with the liquid directly and may cause chemical change to the liquid and/or be harmful to the users. Another improved nozzle assembly 200 is disclosed in FIG. 7 and includes a spring 203 located between the push mount 201 and the cover 202 to avoid the spring 203 from directly contacting the liquid, and the metallic bead is omitted. However, the spring 203 located between the push mount 201 and the cover 202 makes the assembly to be complicate and difficult to be assembled. The amount of the liquid that is sucked by one push is reduced so that the users have to operate many times to get sufficient amount of the liquid.

The present invention intends to provide a push-type nozzle assembly to improve the shortcomings of the above mentioned conventional nozzle assemblies.

SUMMARY OF THE INVENTION

The present invention relates to a push-type nozzle assembly and comprises a main tube, a valve, a suction unit and a push unit. The main tube includes two sections of different diameters and a hose is connected to the main tube. The main tube has a top room and a bottom room which has a smaller diameter than that of the top room. An opening is defined in the bottom room. The valve is located in the bottom room of the main tube and movably seals the opening. The suction unit is located in the top room and has a push rod, a connection rod, a block and a seal sleeve. The push rod is a hollow rod and has a connection portion on the top thereof. The connection rod has a cylindrical portion which is inserted into the push rod. The cylindrical portion has multiple axial paths defined in the outer surface thereof. The connection rod has a disk-shaped stop on the lower section thereof. The block is movably mounted between the push rod and the connection rod. The block has a through hole through which the push rod extends. The through hole has an annular portion so as to be sealed with the stop. The seal sleeve is a hollow tube and mounted between the top room and the push rod. The seal sleeve has a contact portion at the lower end thereof. A spring is mounted between the seal sleeve and the push rod. The spring has its lower end contacting against the contact portion. The spring provides a force to move the block and the connection rod back and forth. The push unit has a cover which is secured to the open top of the container. A push mount is connected to the cover and mounted to the connection portion of the push rod and has an outlet. Because the spring is located outside of the push rod, the spring does directly contact the liquid which is avoided from being chemically changed.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
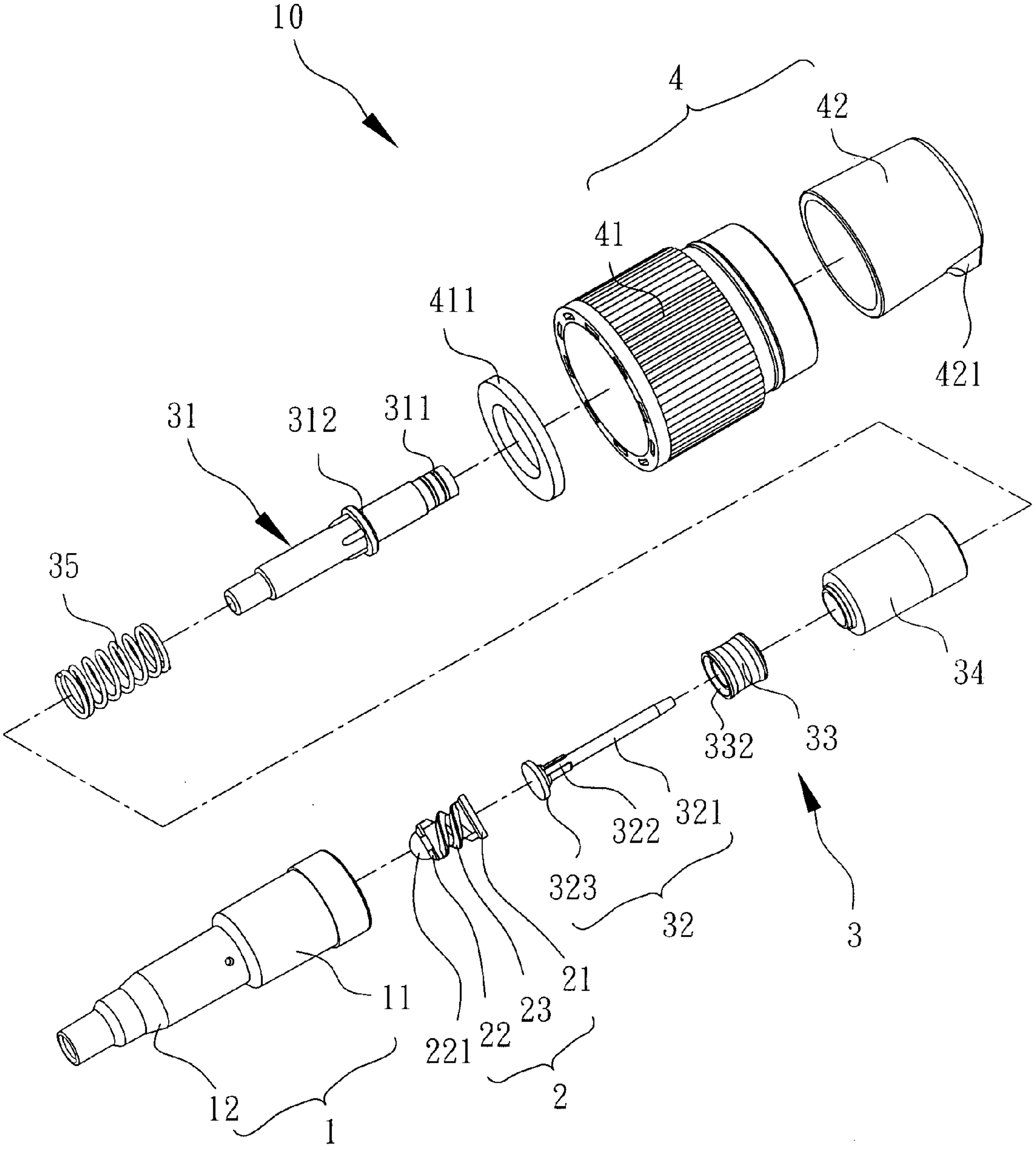
FIG. 1 is an exploded view to show the push-type nozzle assembly of the present invention.
Figure 2:
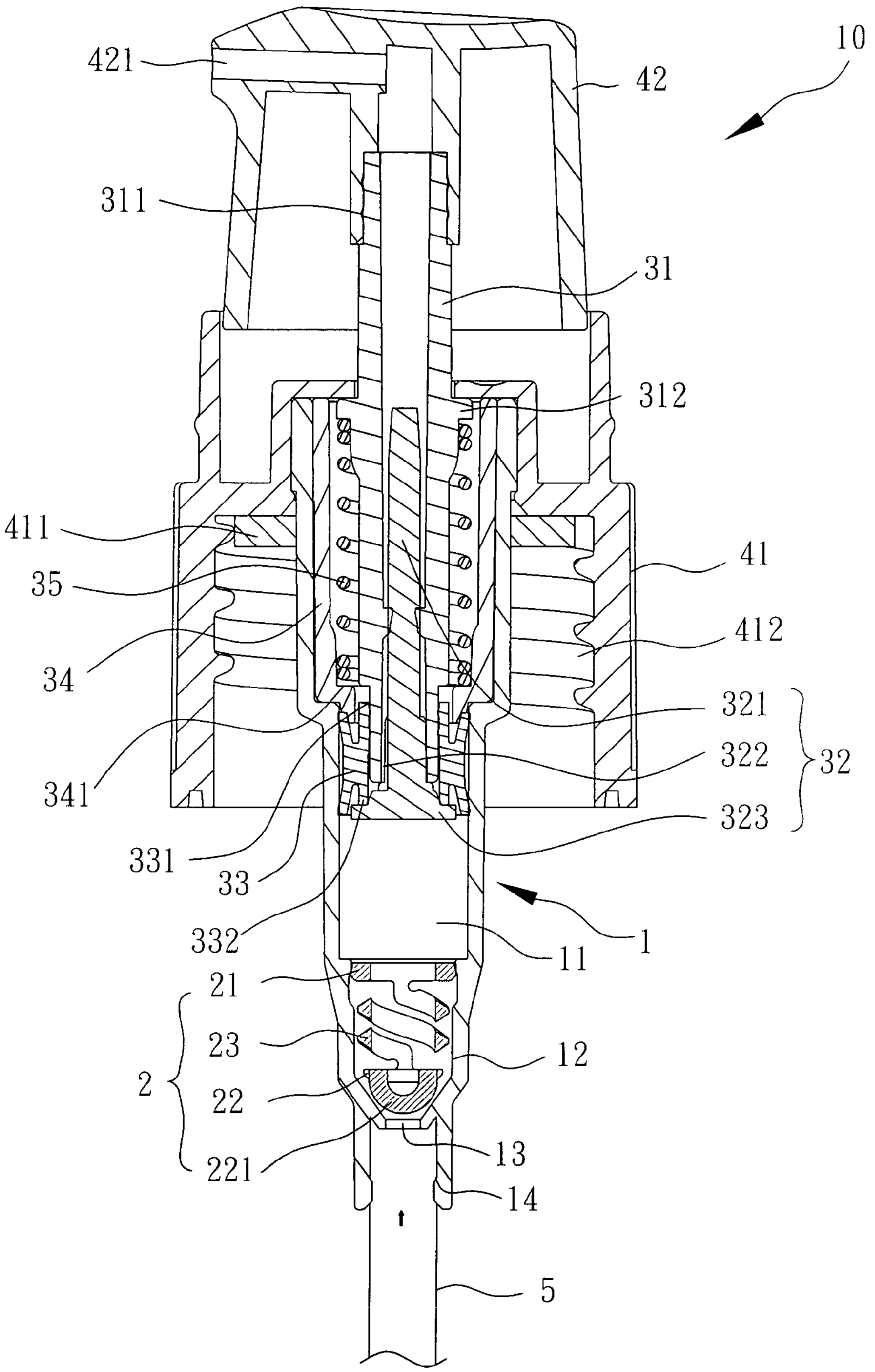
FIG. 2 is a cross sectional view of the push-type nozzle assembly of the present invention.

Referring to FIGS. 1 and 2, the push-type nozzle assembly 10 of the present invention comprises a main tube 1, a valve 2, a suction unit 3 and a push unit 4. The main tube 1 is a tubular member with two sections of different diameters, and a mounting portion 14 is connected to the lower end thereof so as to be connected with a hose 5. The main tube 1 has a top room 11 and a bottom room 12 which has a smaller diameter than that of the top room 11. An opening 13 is defined in the lower portion of the bottom room 12.

Figure 3:
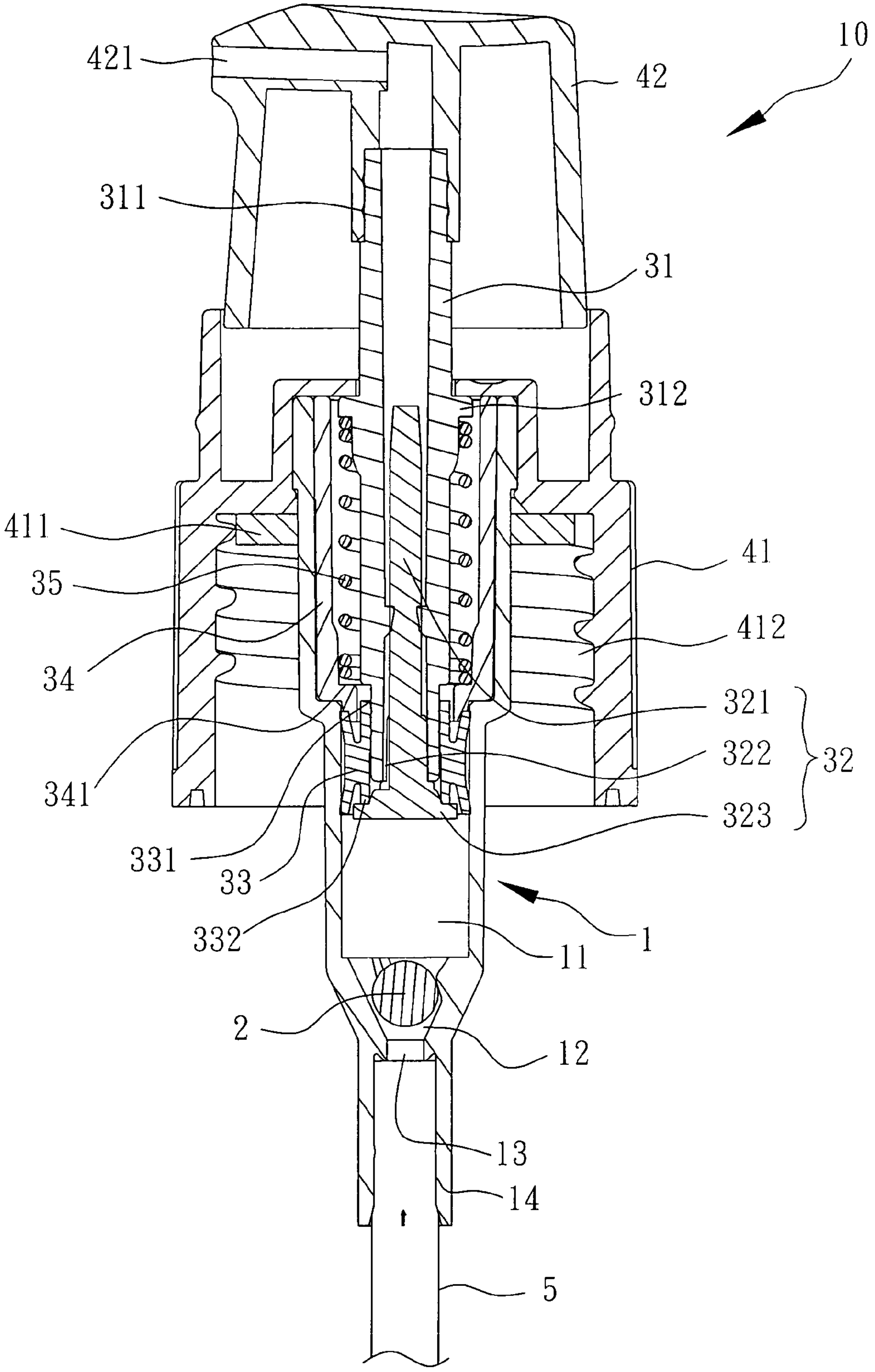
FIG. 3 is a cross sectional view of a second embodiment of the push-type nozzle assembly of the present invention.

The valve 2 is located in the bottom room 12 of the main tube 1 and movable up and down to seal the opening 13. The valve 2 is a spiral and resilient valve which has a first end 21 on the top thereof and a second end 22 on the bottom thereof. A hole is defined in the first end 21. The second end 22 has a head 221 which seals the opening 13 and a resilient portion 23 is connected between the first and second ends 21, 22. The valve 2 can also be a bead as shown in FIG. 3.

The suction unit 3 is located in the top room 11 and comprises a push rod 31, a connection rod 32, a block 33 and a seal sleeve 34. The push rod 31 is a hollow rod and has a connection portion 311 on the top thereof. The push rod 31 has a protrusion 312 on the outer periphery thereof. The connection rod 32 has a cylindrical portion 321 which is inserted into the push rod 31. The cylindrical portion 321 has multiple axial paths 322 defined in the outer surface thereof. The connection rod 32 has a disk-shaped stop 323 on the lower section thereof and the block 33 is movably mounted between the push rod 31 and the connection rod 32. The block 33 has a through hole 331 through which the push rod 31 extends. The through hole 331 has an annular portion 332 at the lower end thereof so as to be sealed with the stop 323. The seal sleeve 34 is a hollow tube and mounted between the top room 11 and the push rod 31. The protrusion 312 of the push rod 31 is located within the seal sleeve 34. The seal sleeve 34 has a contact portion 341 at the lower end thereof. A spring 35 is mounted between the seal sleeve 34 and the protrusion 312 of the push rod 31. The lower end of the spring 35 contacts against the contact portion 341. The spring 35 provides a force to move the block 33 and the connection rod 32 back and forth.

Figure 4:
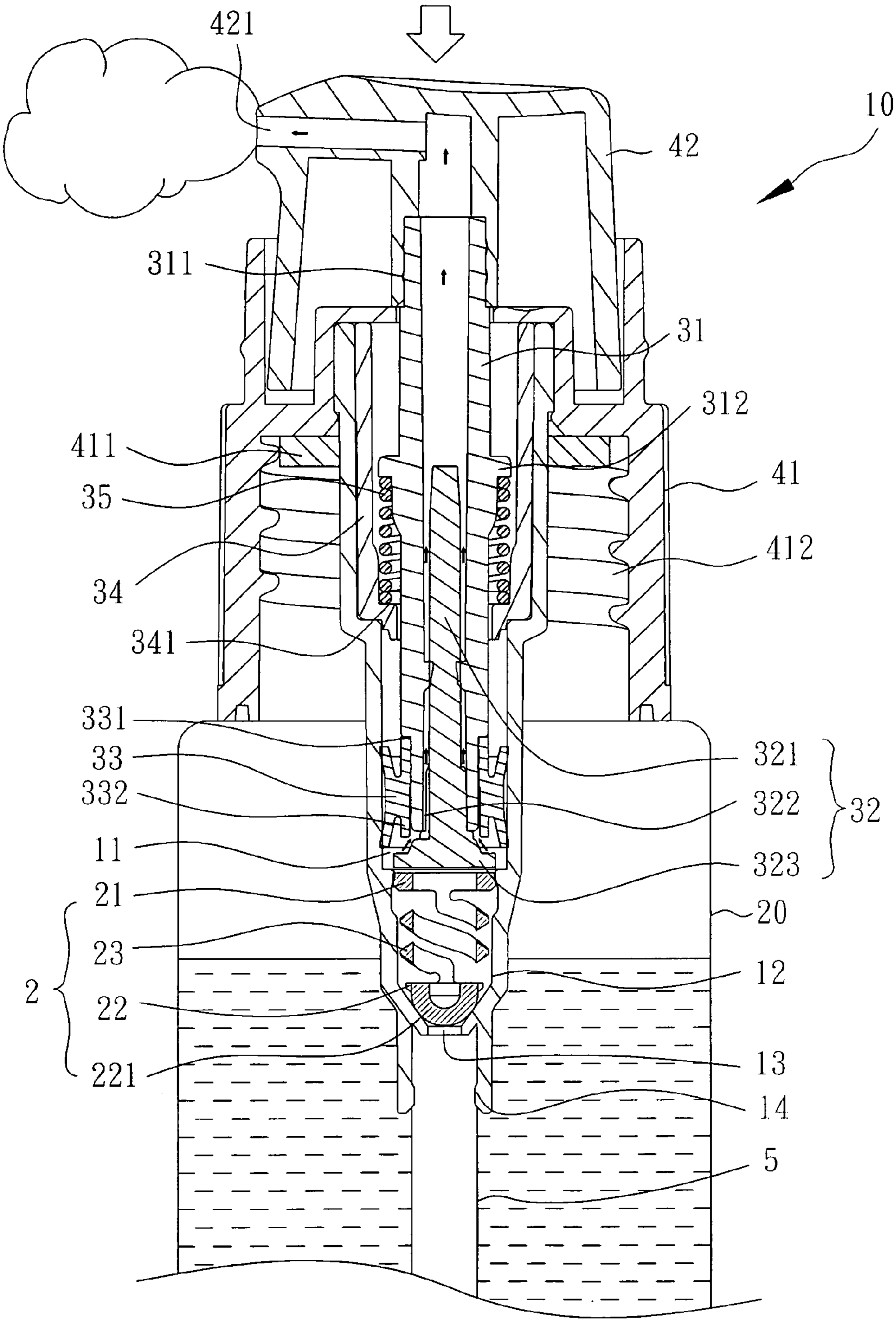
FIG. 4 is a cross sectional view to show the push member of the first embodiment of the push-type nozzle assembly of the present invention is pushed downward.

As shown in FIG. 4, the push unit 4 has a cover 41 secured to the open top of a container 20. The cover 41 includes a threaded portion 412 which is secured to the open top of the container 20. A push mount 42 is connected to the cover 41 and mounted to the connection portion 311 of the push rod 31 and has an outlet 421. The cover 41 has a seal member 411 located therein so as to prevent from leakage.

Because the spring 35 is located between the push rod 31 and the seal sleeve 34 so that the spring 35 does directly contact the liquid which is avoided from being chemically changed. The main tube 1, the valve 2, the suction unit 3 can be modularized so that the stock can be reduced while the range of application is increased.

Referring to FIG. 4, when the push mount 42 is pushed downward, the push rod 31 and the connection rod 32 of the suction unit 3 are lowered, and the space of the top room 11 of the main tube 1 is reduced. The liquid pressure is sufficient to push the head 221 of the valve 2 to move downward to seal the opening 13 so that the main tube 1 is sealed. The stop 323 of the connection rod 32 and the annular portion 332 of the block 33 are separated, the paths 322 of the connection rod 32 are exposed so that the liquid passes through the push rod 31 and escapes from the outlet 421 of the push mount 42.

Figure 5:
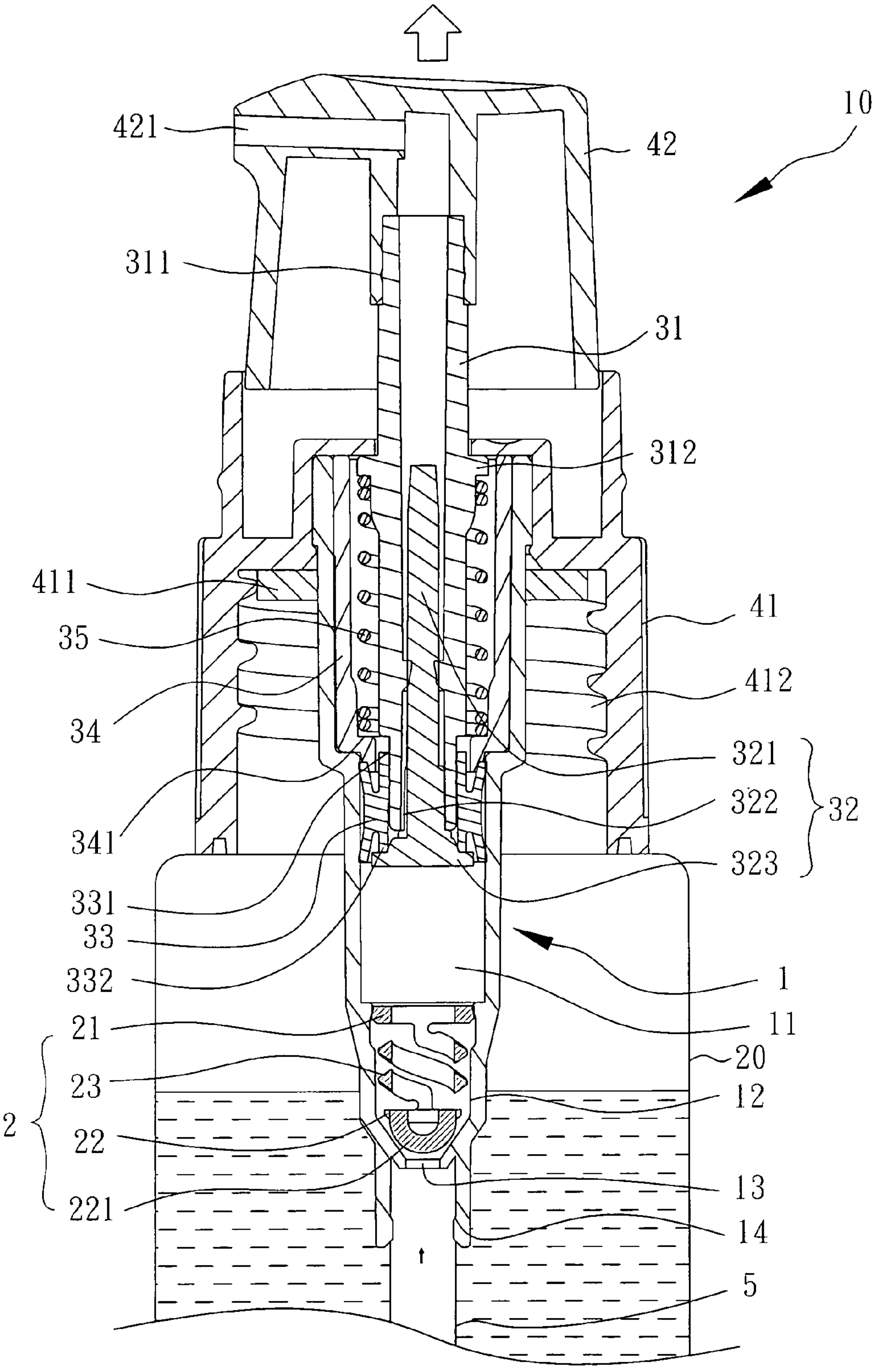
FIG. 5 is a cross sectional view to show the push member of the first embodiment of the push-type nozzle assembly of the present invention is released.
Figure 6:
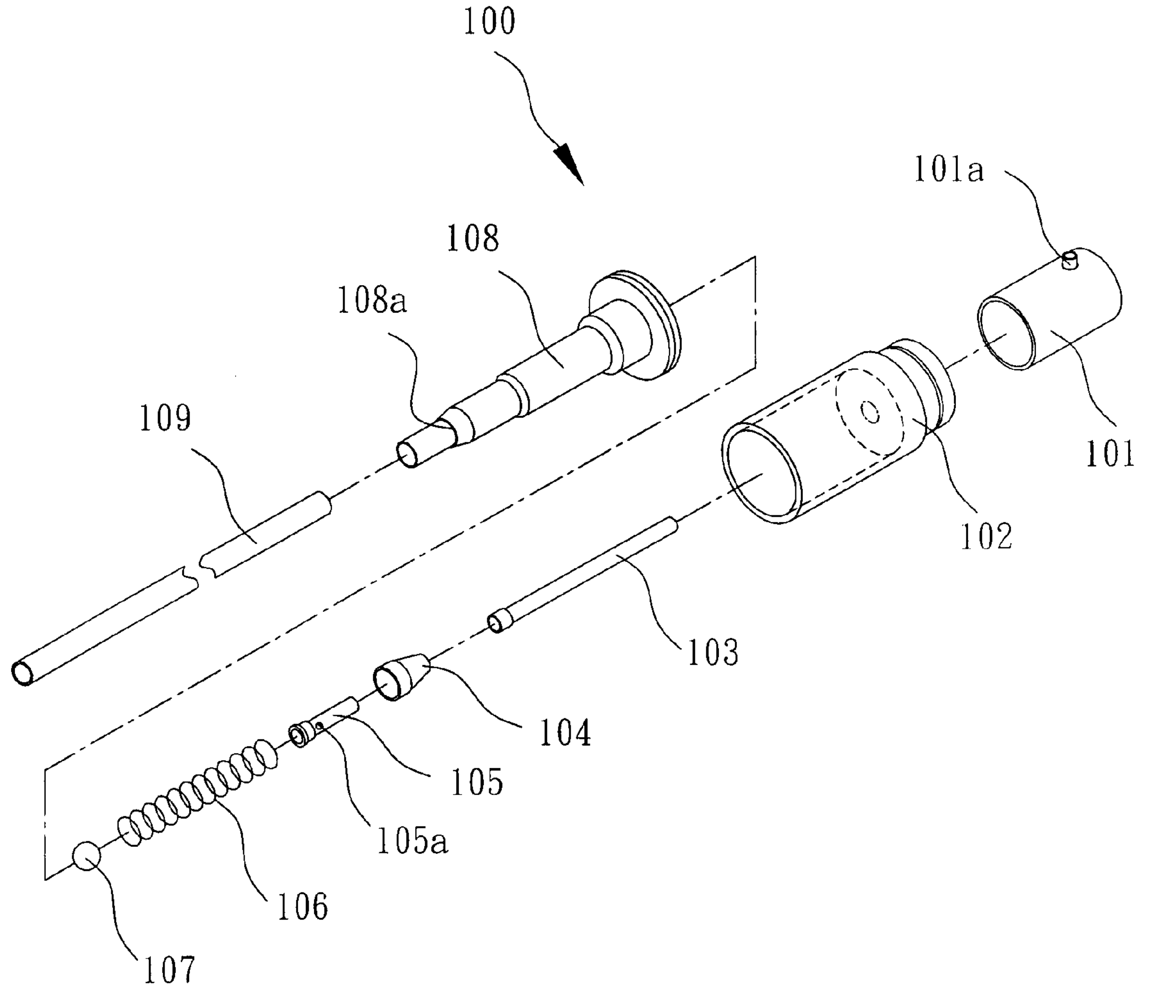
FIG. 6 PRIOR ART
FIG. 6 is an exploded view to show a conventional push-type nozzle assembly.
Figure 7:
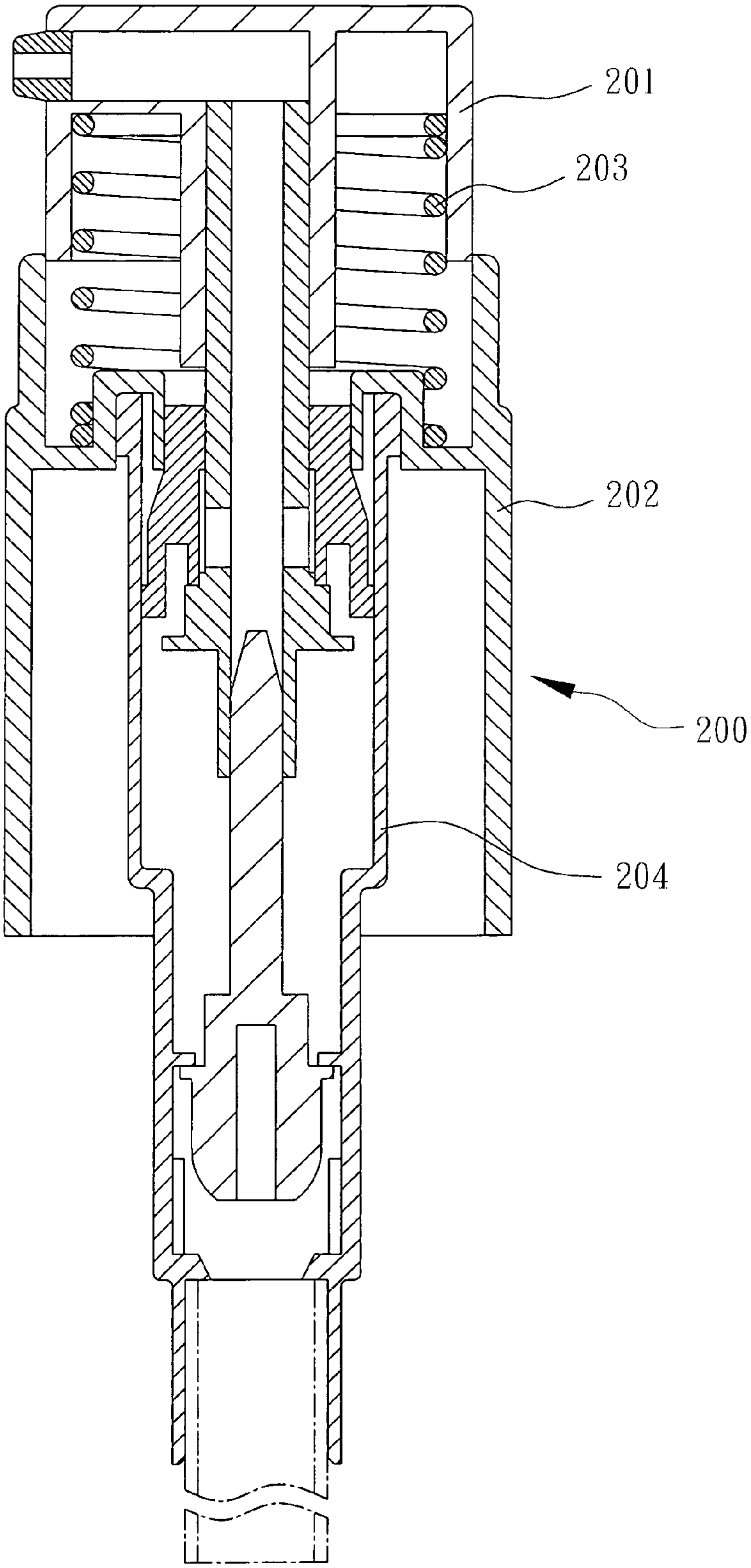
FIG. 7 PRIOR ART
FIG. 7 is a cross sectional view of another conventional push-type nozzle assembly.

As shown in FIG. 5, when the push mount 42 is released, the spring 35 pushes the push rod 31 and the connection rod 32 upward, and the stop 323 of the connection rod 32 and the annular portion 332 of the block 33 are sealed to each other attain. The pressure in the top room 11 is lower than that of outside, the liquid in the container 20 pushes the valve 2 from the opening 13 and the valve 2 is sucked into the top room 11 and ready for the next push.

While we have shown and described the embodiment in accordance with the present invention, it should be clear to those skilled in the art that further embodiments may be made without departing from the scope of the present invention.

What is claimed is:

1. A push-type nozzle assembly comprising:

a main tube being a tubular member with two sections of different diameters, a hose connected to the main tube which has a top room and a bottom room which has a smaller diameter than that of the top room, an opening defined in a lower portion of the bottom room;

a valve located in the bottom room of the main tube and movably sealing the opening, the valve being a spiral and resilient valve which has a first end on a top thereof and a second end on a bottom thereof, a hole defined in the first end, the second end having a substantially hemispheric head which seals the opening and a flange protrudent from the head, a single resilient portion is connected between the first and second ends;

a suction unit located in the top room and having a push rod, a connection rod, a block and a seal sleeve, the push rod being a hollow rod and having a connection portion on a top thereof, the push rod having a protrusion on an outer periphery thereof, the connection rod having a cylindrical portion inserted into the push rod, the cylindrical portion having multiple axial paths defined in an outer surface thereof, the connection rod having a disk-shaped stop on a lower section thereof, an end surface of the stop being a complete plane, the block movably mounted between the push rod and the connection rod, the block having a through hole through which the push rod extends, the through hole having an annular portion at a lower end thereof so as to be sealed with the stop, the seal sleeve being a hollow tube and mounted between the top room and the push rod, the seal sleeve having a contact portion at a lower end thereof, a spring being mounted between the contact portion of seal sleeve and the protrusion of the push rod, the spring providing a force to move the block and the connection rod back and forth, and a push unit having a cover which is adapted to be secured to an open top of a container, a push mount connected to the cover and mounted to the connection portion of the push rod and having an outlet, wherein the protrusion abuts the cover when the push rod is upward, in a non-actuated position, the protrusion and the seal sleeve are secured within the cover, and the protrusion of the push rod is completely restricted within the seal sleeve.

2. The assembly as claimed in claim 1, wherein the cover includes a threaded portion which is adapted to be secured to the open top of the container.

3. The assembly as claimed in claim 1, wherein the cover has a seal member located therein.

4. The assembly as claimed in claim 1, wherein the main tube has a mounting portion and the hose is connected to the mounting portion.

5. The assembly as claimed in claim 1, wherein an outer diameter of the flange is between the resilient portion and the head.

6. A push-type nozzle assembly comprising:

a main tube being a tubular member with two sections of different diameters, a hose connected to the main tube which has a top room and a bottom room which has a smaller diameter than that of the top room, an opening defined in a lower portion of the bottom room;

a valve located in the bottom room of the main tube and movably sealing the opening, the valve being a spiral and resilient valve which has a first end on a top thereof and a second end on a bottom thereof, a hole defined in the first end, the second end having a substantially hemispheric head which seals the opening and a flange protrudent from the head, a single resilient portion is connected between the first and second ends;

a suction unit located in the top room and having a push rod, a connection rod, a block and a seal sleeve, the push rod being a hollow rod and having a connection portion on a top thereof, the push rod having a protrusion on an outer periphery thereof, the connection rod having a cylindrical portion inserted into the push rod, the cylindrical portion having multiple axial paths defined in an outer surface thereof, the connection rod having a disk-shaped stop on a lower section thereof, an end surface of the stop being a complete plane, the block movably mounted between the push rod and the connection rod, the block having a through hole through which the push rod extends, the through hole having an annular portion at a lower end thereof so as to be sealed with the stop, the seal sleeve being a hollow tube and mounted between the top room and the push rod, the seal sleeve having a contact portion at a lower end thereof, a spring being mounted between the contact portion of seal sleeve and the protrusion of the push rod, the spring providing a force to move the block and the connection rod back and forth, and a push unit having a cover which is adapted to be secured to an open top of a container, a push mount connected to the cover and mounted to the connection portion of the push rod and having an outlet, wherein the protrusion abuts the cover when the push rod is upward, in a non-actuated position, the protrusion and the seal sleeve are secured within the cover, and the protrusion of the push rod is completely restricted within the seal sleeve;

wherein the cover includes a threaded portion which is adapted to be secured to the open top of the container, the cover has a seal member located therein, the main tube has a mounting portion and the hose is connected to the mounting portion, and an outer diameter of the flange is between the resilient portion and the head.

* * * * *